No. 759,353. Patented May 10, 1904.

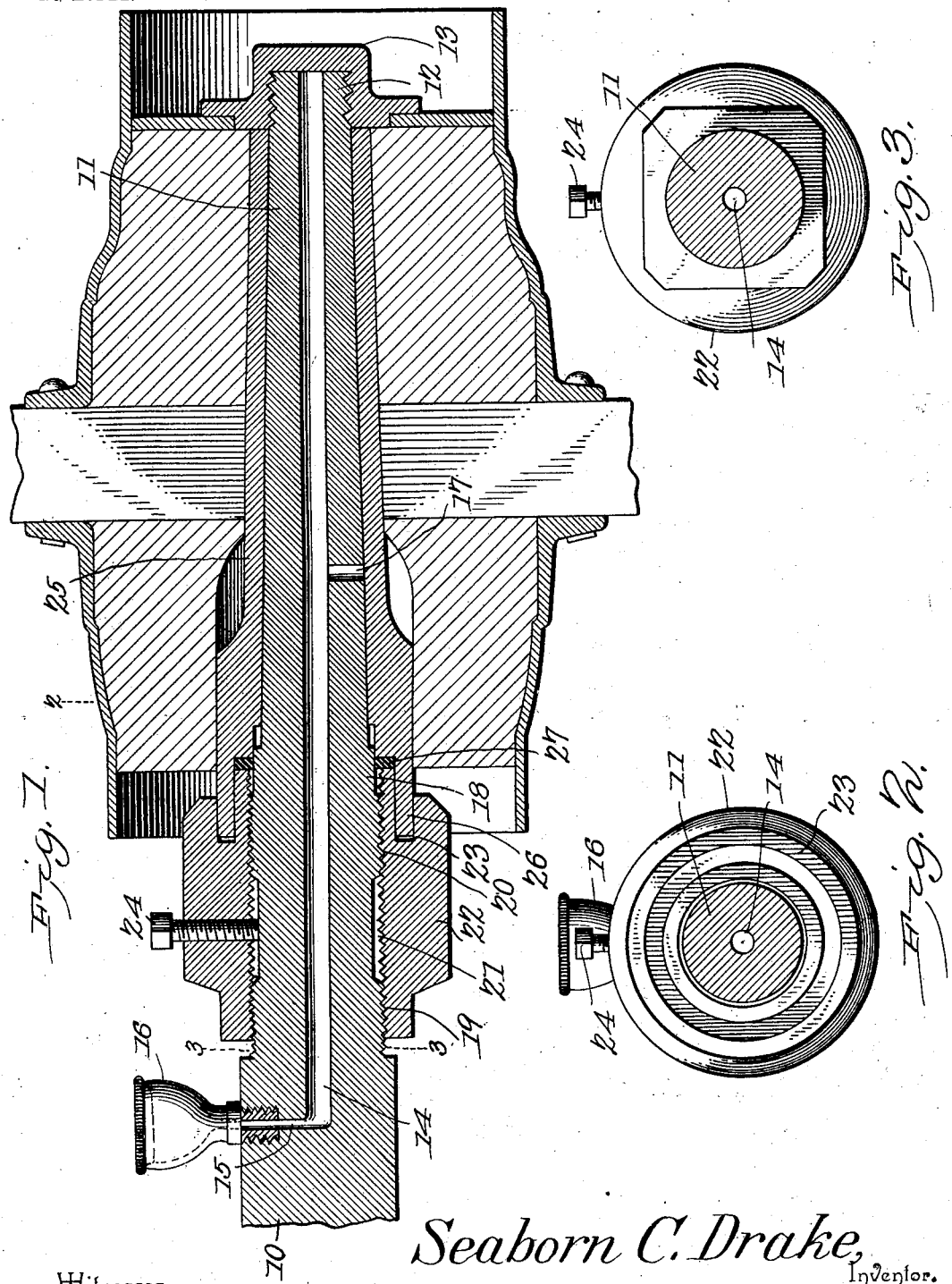

UNITED STATES PATENT OFFICE.

SEABORN CALLAWAY DRAKE, OF WASHINGTON, GEORGIA, ASSIGNOR OF ONE-HALF TO ROBERT BENJAMIN DRAKE AND ASA TUCKER DRAKE, OF WASHINGTON, GEORGIA.

VEHICLE-AXLE.

SPECIFICATION forming part of Letters Patent No. 759,353, dated May 10, 1904.

Application filed January 12, 1904. Serial No. 188,734. (No model.)

*To all whom it may concern:*

Be it known that I, SEABORN CALLAWAY DRAKE, a citizen of the United States, residing at Washington, in the county of Wilkes and State of Georgia, have invented a new and useful Vehicle-Axle, of which the following is a specification.

This invention relates to improvements in vehicle-axle bearings, and has for its object to provide a simply-constructed and easily applied and operated device of this character whereby the spindle and skein are protected from moisture, dust, and other foreign matter and whereby the parts may be mutually adjusted to take up the lost motion caused by wear or from other causes and also to provide for lubricating the spindle without removing the wheels therefrom.

The invention consists in certain novel features of construction, as hereinafter shown and described, and specified in the claims.

In the drawings illustrative of the invention, in which corresponding parts are denoted by like designating characters, Figure 1 is a longitudinal sectional elevation. Fig. 2 is a transverse section on the line 2 2 of Fig. 1 with the hub and its skein detached. Fig. 3 is a rear elevation of the adjustable sleeve with the spindle in section on the line 3 3 of Fig. 1.

In the improved device, 10 represents a portion of the axle, and 11 one of the spindles, terminating in the threaded outer end 12 for the usual hub-holding nut 13. The spindle 11 is provided with a longitudinal oil-duct 14, opening through the outer end and closed by the nut 13 and extending into the axle portion 10 and with a lateral branch 15 emerging through the axle and provided with a feed-cup 16 of any suitable form. The duct 14 is provided with one or more feed branches 17, leading through the spindle to provide for the escape of the lubricant. The inner or axle end of the spindle is preferably enlarged, as at 18, and the enlarged portion externally threaded in two spaced sections, as at 19 20, whereby an unthreaded intermediate portion 21 is formed, as shown. Engaging the threaded portions 19 20 is a threaded sleeve 22, having an annular chamber 23 in its outer end and a set-screw 24 tapped therethrough and bearing upon the unthreaded portion 21 of the spindle or between the threaded portions 19 20. By this means it is obvious that the sleeve may be adjusted longitudinally of the spindle by merely loosening the set-screw and rotating the sleeve and then firmly clamping the sleeve at any desired point by again "setting up" the set-screw.

The set-screw, it will be noted, bears only on the unthreaded portion 21 of the spindle and does not, therefore, injure the threads by its pressure, and to provide a bearing-surface for the set-screw which will not affect the threaded portions is the object of the blank space 21, as will be obvious.

The hub-box is represented at 25 as of the usual form except that it is provided with an annular flange 26 for engaging the chamber 23 and with a packing 27, of rubber or similar material, as shown. By this simple arrangement the sleeve 22 serves as a means for adjusting the hub and its box upon the spindle and maintaining the wheel in true running position and effectually preventing rattling and longitudinal movement and also enabling lost motion caused by wear of the engaging ends of the hub-box and the sleeve to be quickly "taken up," as will be obvious.

The compressible packing-ring 27 effectually prevents the entrance of dust, sand, moisture, and other matter which would deleteriously affect the spindle, while at the same time also effectually preventing the escape of oil or other lubricating material.

The means for lubricating the spindle without removing the wheels is also an important advantage and adds materially to the value and efficacy of the device.

An axle-spindle and wheel equipped with the improvements herein described will outlast devices of this character as ordinarily constructed many times and will require the application of the lubricant only at long intervals, owing to the large supply in the duct 14.

In applying the device the oil is poured into the cup 16 until the duct 14 is filled and the oil backs up into and fills the cup 16, and then when the cap of the cup is screwed thereon slight pressure is produced, which causes the oil to slowly ooze out through the feed-aperture 17 and only so fast as is required to keep the spindle thoroughly lubricated as long as any oil remains. The oil is thus used with economy and none is wasted, as it comes in contact only with the bearing-surface of the spindle. By this arrangement of parts the spindle can be constantly maintained in a dust-proof condition by adjusting the sleeve 21, as above described, and no matter how badly worn the dust-excluding feature remains effective.

The device is very simple in construction, effective in action, and will accomplish all the valuable results desired in devices of this character.

The device is readily adaptable to all the various forms and sizes of axles and hub-boxes and to vehicles of all the various kinds manufactured.

The improved device may be readily adapted to all the various constructions employed upon motor-vehicles, including spindles having ball-bearing attachments; but as these various structures are so well known they are not illustrated, as they form no part of the present invention.

Having thus described my invention, what I claim is—

1. An axle-spindle threaded at the outer end and with the inner or axle end provided with threaded portions spaced apart whereby an unthreaded intermediate section is formed, a threaded sleeve engaging said threaded axle end and having an annular chamber in its outer end, a hub-box engaging said axle and supported thereon by a holding-nut engaging the outer threaded end of the spindle and with an annular flange engaging said annular chamber, and a set-screw tapped through said sleeve and bearing upon said unthreaded section of the axle end, substantially as described.

2. A spindle having spaced externally-screw-threaded portions at the inner end thereof, an internally-screw-threaded dust-guard sleeve adjustably engaging the screw-threaded portions of the spindle, and an adjusting set-screw piercing the sleeve to engage the unthreaded portion of the spindle between the screw-threaded portions thereof.

In testimony that I claim the foregoing as my own I have hereto affixed my signature in the presence of two witnesses.

SEABORN CALLAWAY DRAKE.

Witnesses:
   IDA HILL BARNETT,
   A. A. BARNETT.